US009946899B1

(12) United States Patent
Wesson et al.

(10) Patent No.: US 9,946,899 B1
(45) Date of Patent: Apr. 17, 2018

(54) ACTIVE ASIC INTRUSION SHIELD

(71) Applicant: Google Inc., Mountain View, CA (US)

(72) Inventors: William Wesson, Mountain View, CA (US); Scott Johnson, Mountain View, CA (US); Lynn Bos, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/294,525

(22) Filed: Oct. 14, 2016

(51) Int. Cl.
*G06F 21/00* (2013.01)
*G06F 21/76* (2013.01)
*G06F 21/50* (2013.01)
*G06F 1/14* (2006.01)
*G06F 1/26* (2006.01)

(52) U.S. Cl.
CPC .............. *G06F 21/76* (2013.01); *G06F 1/14* (2013.01); *G06F 1/26* (2013.01); *G06F 21/50* (2013.01)

(58) Field of Classification Search
None
See application file for complete search history.

(56) References Cited

U.S. PATENT DOCUMENTS

| 8,359,478 B2 | 1/2013 | Bonizec et al. |
| 2009/0077669 A1 | 3/2009 | Buer |
| 2010/0001757 A1 | 1/2010 | Janke et al. |
| 2015/0347762 A1 | 12/2015 | Horne |
| 2015/0379269 A1 | 12/2015 | Grawrock et al. |
| 2016/0026829 A1 | 1/2016 | Brocker |
| 2016/0028722 A1 | 1/2016 | Kocher et al. |
| 2016/0078226 A1 | 3/2016 | Dalton et al. |
| 2016/0211843 A1 | 7/2016 | Wang |

FOREIGN PATENT DOCUMENTS

WO  WO 2010/011399 A2  1/2010

OTHER PUBLICATIONS

"Written Opinion", PCT Application No. PCT/US2017/046341, dated Oct. 12, 2017, 8 pages.
IBM PCI Cryptographic Coprocessor General Information Manual, Sixth Edition May 2002.
Karen Mercedes Goertzel, "Integrated Circuit Security Threats and Hardware Assurance Countermeasures", CrossTalk, Nov./Dec. 2013.
Sean Smith et al., IBM Research Report, "Building a High-Performance, Programmable Secure Coprocessor", IBM Research Division, Yorktown Heights, NY, RC 21102(94393) Feb. 19, 1998.

*Primary Examiner* — David Le
(74) *Attorney, Agent, or Firm* — Colby Nipper

(57) ABSTRACT

Provided are systems, methods, and apparatus for protecting an integrated circuit against invasive attacks and various forms of tampering. A defensive mechanism is an active physical security shield that includes an array of traces at a high metal of the integrated circuit, covering a high percentage of the surface area of that layer, and a collection of digital logic components that drive signals across the traces. The driving of the signals across the traces is done in an active manner such that a short, open, or stuck-at fault on any of the traces is detected within a very short period of time. The active security system is connected to or in communication with an alert response mechanism, such that a fault detected by the security system results in a signal being sent to the alert response mechanism.

20 Claims, 4 Drawing Sheets

ACTIVE ASIC INTRUSION SHIELD

BACKGROUND

A high-performance application specific integrated circuit (ASIC) must be secure against a variety of dedicated attacks from unauthorized adversaries. One class of attack involves physically probing, modifying, or destroying the logic within the ASIC. This type of tampering usually involves several steps including, for example, (1) physically decapping the package to have physical exposure to the wiring and logic on the silicon die; (2) boring holes into the surface protection layer to give access to metal contacts; (3) physically probing (while active) the wires at the top layer of the device to determine their content; (4) cutting top-level wires deemed to be unimportant in order to gain access to more interesting content on lower layers, possibly down to the base layer; (5) using a Focused Ion Beam (FIB) to cut wires to potentially turn off critical security features; and (6) depositing metal to create new connections to modify critical functionality.

Despite the numerous steps involved, unauthorized parties are becoming more sophisticated in their techniques for physically probing, modifying, and/or destroying the logic within ASICs. To protect against efforts to compromise the device's correct operation and functionality, it is important to have a physical security system that can detect any of the above activities while the chip is active, as well as detect upon start up if any of these activities occurred during the last power down period.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to integrated circuits. More specifically, aspects of the present disclosure relate to a protecting against invasive attacks on an application specific integrated circuit.

One embodiment of the present disclosure relates to an apparatus for securing an integrated circuit from an invasive attack, the apparatus comprising: an array of trace wires arranged across at least a top metal layer of the integrated circuit; a pseudo-random binary sequence generator for generating a plurality of bits; a true random number generator for providing a source of entropy to at least one of a plurality of tap points fed to the pseudo-random binary sequence generator; and comparison circuitry connected to one end of the array of trace wires, where the comparison circuitry determines whether at least one of the trace wires has an expected value based on a bit generated by the pseudo-random binary sequence generator and received at the one end of the at least one trace wire.

In another embodiment, the apparatus for securing an integrated circuit from an invasive attack further comprises demultiplexing circuitry that connects the pseudo-random binary sequence generator to another end of the array of trace wires.

In yet another embodiment, the apparatus for securing an integrated circuit from an invasive attack further comprises an alert response system for determining whether to initiate one or more actions in response to the alert signal generated by the comparison circuitry.

In one or more other embodiments, the methods, systems, and apparatus described herein may optionally include one or more of the following additional features: each of the plurality of bits generated by the pseudo-random binary sequence generator is unique from its neighboring bits when transferred to the array of trace wires; the pseudo-random binary sequence generator is a linear feedback shift register; a subset of the trace wires is toggled according to a real time clock period; the comparison circuitry compares all of the trace wires each real time clock cycle; the comparison circuitry determines whether at least one of the trace wires has an expected value each real time clock cycle; the demultiplexing circuitry drives only one of the trace wires each real time clock cycle, and the remaining trace wires are grounded; the comparison circuitry detects, based on the bit received at the second end of the at least one trace wire, one of a short-circuit fault, an open-fault, and a stuck-at fault; the comparison circuitry generates an alert signal in response to detecting the one of a short-circuit fault, an open-fault, and a stuck-at fault; the alert response system determines whether a number of alert signals generated by the comparison circuitry satisfies a condition, and in response to determining that the number of alert signals satisfies the condition, the alert response system initiates the one or more actions; the alert response system determines that the number of alert signals satisfies the condition if the number of alert signals generated by the comparison circuitry exceeds a threshold number within a predetermined period of time; the alert response system determines that the number of alert signals satisfies the condition if a time interval between the generation of each of the alert signals is within a threshold period of time; and/or the one or more actions include at least one of sending an interrupt to a processor of the integrated circuit, and controlling a power supply of the integrated circuit.

It should be noted that embodiments of some or all of the processor and memory systems disclosed herein may also be configured to perform some or all of the method embodiments disclosed above. In addition, embodiments of some or all of the methods disclosed above may also be represented as instructions embodied on non-transitory processor-readable storage media such as optical or magnetic memory.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

Figure 1:
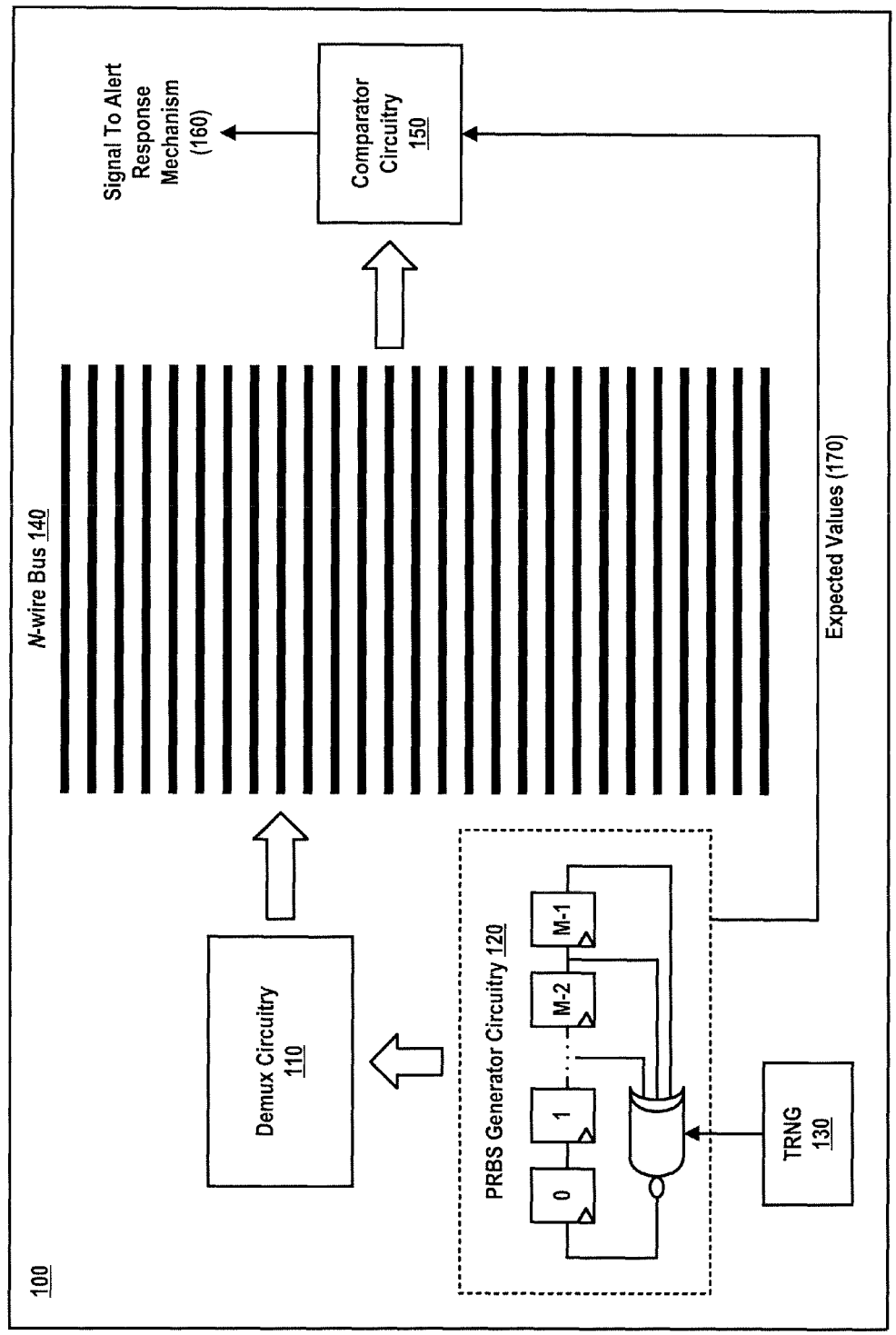
FIG. 1 is a block diagram illustrating an example system for defending against invasive attacks on an application specific integrated circuit according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Embodiments of the present disclosure relate to a defense mechanism or system designed to protect an integrated circuit (IC) (e.g., an ASIC) against, for example, probe attacks, FIBs, and other such tampering. As will be described in greater detail below, the defense mechanism may be an active physical security shield that includes an array of traces (e.g., trace wires) at a high metal layer (e.g., top one or two metal layers available to entirely cover or substantially cover sensitive circuitry) of the IC, preferably covering a high percentage (e.g., 80%, 90%, 95%, etc.) of the surface area of that layer, and a collection of digital logic components that may drive signals across the traces.

In accordance with at least one embodiment, signals (e.g., bits generated by a linear feedback register, or the like) may be actively driven across the traces such that a short-circuit fault, an open-fault (e.g. a broken trace wire), or stuck-at fault (e.g., signal or gate output is stuck at a "0" or "1" value) on any of the traces may be detected within a short period of time. For example, in accordance with at least one embodiment, the detection time for detecting a fault on one of the traces may be on the order of a few clock cycles, with the frequency being application specific. For low-power implementations, this may be on the order of a few microseconds for a breach to be detected. For example, with a frequency of 250 kHz, the detection time would be 1/250 kHz=4 us.

It should also be noted that, in accordance with one or more embodiments, there may be a lower limit on fault detection times due to the propagation delay of signals across the wires (e.g., larger chips have larger propagation delays, and therefore the detection times with such larger chips may be limited by the applicable propagation delay).

Further, in one or more embodiments, the active security system/mechanism of the present disclosure may be connected to, include, and/or otherwise be in communication with (e.g., via a direct or indirect connection over a wired or wireless network) an associated alert response mechanism or system (e.g., a dedicated processor of the integrated circuit), such that a fault detected by the security system may be indicated as an alert sent to the alert response mechanism. In at least one embodiment, the security system and/or the alert response mechanism may be connected to or in communication with a processor of the IC. For example, if it is determined (e.g., by the alert response mechanism) based on a detected fault by the security system that an actionable response should be taken to address a potential threat against the IC, various protective or preventative measures may be initiated such as an interrupt to the processor, a complete shut-down of the IC, or the like.

FIG. 1 is an example security system 100 for defending against invasive or intrusive attacks on an IC. In accordance with at least one embodiment, the system 100 includes a M-bit PRBS (Pseudo Random Binary Sequence) generator circuitry 120, a true random number generator circuit (TRNG) 130 to provide a source of entropy to the PRBS generator circuitry 120, a N-wire bus 140 crossing a high metal layer of the IC (e.g., top one or two metal layers available to entirely cover or substantially cover sensitive circuitry of the IC), demultiplexing circuitry 110 to convert M to N, and comparator circuitry 150 to check and ensure that the N wires have the correct (e.g., expected) value at sampling time. In addition, the system 100 may also include one or more registers to control various components of the system, and also an alert response mechanism or circuit (not shown).

In accordance with one or more embodiments, other routing configurations may be used for the N-wire bus 140 in addition to or instead of the example configuration shown. These other routing configurations may depend on a variety of factors including, for example, the number (N) of trace wires (e.g., 1000 wires, 1200 wires, 1485 wires, 1550 wires, etc.), the thickness of the wires, spacing between adjacent wires, and the like.

Figure 3C:
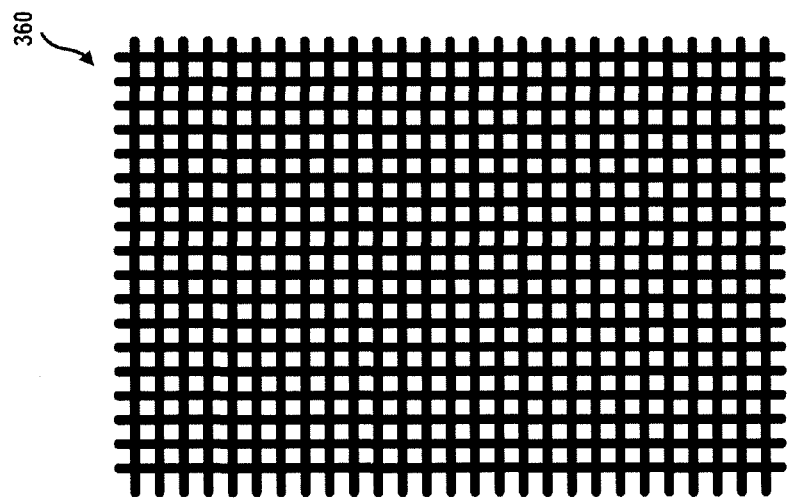
FIGS. 3A-3C illustrate example routing configurations for routing trace wires across a layer of an integrated circuit according to one or more embodiments described herein.
Figure 3A:
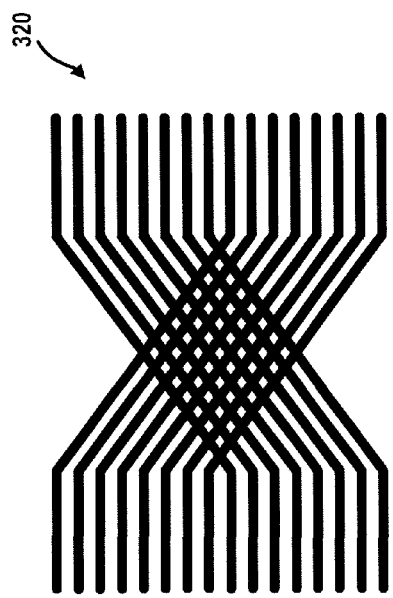
Figure 3B:
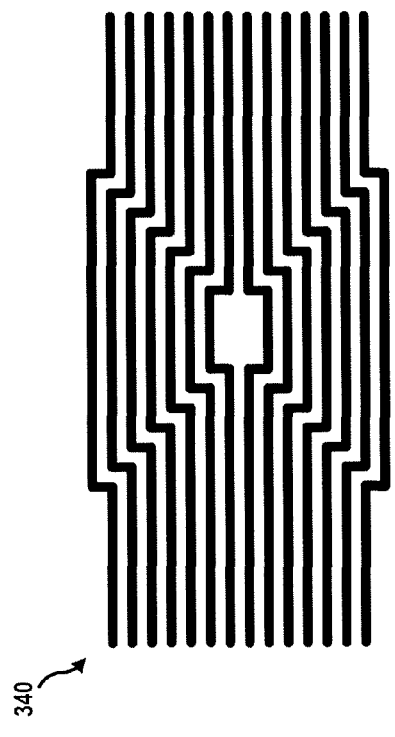

Examples of such other routing configurations are shown in FIGS. 3A to 3C. For example, the array of trace wires (of the N-wire bus 140) may be routed across the metal layer of the IC in a zig-zag configuration (320 shown in FIG. 3A), or in a maze-like configuration (340 shown in FIG. 3B). It should be understood that various other routing configurations may also be used, as long as such configurations ensure maximum coverage while also avoiding areas where easy cuts and jumps (with FIB+deposition) can be made over an area of interest. For example, the N-wire bus 140 may be designed to include as many unique traces covering the chip as possible, so that any reasonable opening requires a large number of cuts and jumps, which is costly and difficult. Furthermore, in at least one embodiment, more than one top metal layer of the IC may be used for the wire bus. For example, at a top metal layer of the IC, trace wires may be routed across surface of the layer in a first direction (e.g., horizontally or across the width of the layer), and at metal layer just beneath the top layer, trace wires may be routed across the surface of the layer in a second direction perpendicular to the first direction (e.g., vertically or across the length of the layer). FIG. 3C illustrates an example of such an arrangement (360).

In accordance with at least one embodiment, the M-bit PRBS generator circuitry 120 (where "M" is an arbitrary value such as, for example 99) may be a Linear Feedback Shift Register (LFSR), where M−1 bits are shifted down, and the new bit that is shifted in is an EXCLUSIVE-OR (XOR) (e.g., using an XOR gate) of several tap points in the register, including the bit that was shifted out, and one bit that is tied to an entropy source (e.g., coming out of the TRNG 130) to enhance randomization. It is known to those of ordinary skill in the art that with the right sequence of tap points, a PRBS can be generated for any value M with a repeating period of $2^{M-1}$ without an entropy source. However, with an entropy source, such as, for example, TRNG 130, there should be no predictable repeat.

It should be noted that to minimize power drain (e.g., since in at least one embodiment the number of trace wires crossing the chip may be relatively large, each with a fair amount of capacitance), the shifting of the PRBS generator 120 may not be done every core cycle. Rather, the PRBS generator 120 may be shifted in accordance with a real time clock (RTC) toggling on the order of, for example, 250 kHz. In accordance with at least one embodiment, the RTC may be separate from the main (core) clock of the chip. In such an embodiment, the RTC may be slower than the main clock to help reduce power consumption and noise on chip. It should be noted that although a separate clock (RTC) from the main clock may be used for the security system (shield), such a separate clock may not be dedicated strictly to the security system, but instead may serve additional purposes and/or components of the chip.

It should be understood that in the example system described herein (e.g., system 100), the precise value of what is generated by the PRBS generator circuitry 120 is of less significance than that each bit of the PRBS 120 is changing in a relatively obscure fashion, and at a relatively frequent rate (e.g., 250 kHz updates), such that each bit (as it is transferred to the array of wires 140) is unique from its neighboring bits. The bits of the PRBS 120 are said to change in an "obscure" manner based on the fact that the PRBS 120 is updated with the TRNG 130 output. If the PRBS 120 was only seeded at startup (or was very infrequently reseeded) then an attacker could potentially predict future PRBS 120 values based on previous values. Thus, the TRNG 130 is designed to obscure future PRBS 120 values, thereby making it much more difficult for attackers to guess future values (which the attackers could then drive on cut wires to avoid detection). Although 250 kHz updates is relatively slow (e.g., compared to core clock frequencies of tens of MHz), it should be understood that "frequent," with respect to the rate at which each bit of the PRBS 120 may change, can mean often enough that a cut and jump could not be possible while the chip is active.

It should be noted that it is not necessary (although possible) for all of the trace wires to be toggled at the same time. For example, in at least one implementation, the amount of toggling may be reduced (e.g., 1 in 15 wires toggles every RTC clock period) in order to not draw too much current physically at every RTC clock edge. In such an embodiment, the next adjacent wire (e.g., to the one toggled) may then be toggled on the next clock cycle, and so on. In accordance with one or more other embodiments, an additional PRBS may be used to randomly determine which one or more of the trace wires are to be toggled during the next clock cycle, rather than linearly stepping through the traces as described above.

To reduce logic complexity and area, the size of the PRBS generator circuitry 120 may be significantly smaller than the number of wires (N) in the wire bus 140 crossing the chip. To connect the M-bit PRBS 120 to the N wires crossing in metal, the system 100 may include, in one or more embodiments, demultiplexing logic circuitry 110. For example, in accordance with at least one embodiment, the ratio N:M is an integer denoted as R. In the demultiplexing logic circuitry 110, only one out of R wires may be driven each cycle, while the other wires remain grounded for that cycle (where "cycle" refers to the period of the PRBS 140 shift, each RTC clock cycle). Each new cycle of the PRBS 120, the next one of the R wires may be driven. Such a technique effectively results in an assignment of the wires as follows (where such an assignment is merely for illustrative purposes), where cur_sel is a register containing a value from 0 to R−1, indicating which wire to drive on within the ratio:

for($a$=0;$a$<M;$a$++)

for($b$=0;$b$<R;$b$++)

WIRES[$a$*R+$b$]=(cur_sel==$b$) & prbs[$a$]

In accordance with at least one embodiment, more than one of the R wires may be driven per cycle of the PRBS 120. However, depending on the particular implementation, power (e.g., battery-powered devices may have strict power requirements) and/or signal integrity (e.g., whether the shield is introducing too much noise that the main circuits of the IC are affected) may limit the number of wires driven for a given cycle of the PRBS 120. In an embodiment where more than one wire may be driven at a time, the wires can be separated physically so that the power consumption is distributed throughout the power grid (and its bypass capacitance) of the IC.

The physically drawn array of N wires (N-wire bus 140) crossing a high metal layer of the IC creates a physically and electrically dense grid intended to keep out various types of invasive attacks including, for example, probing, visual inspection, and the like. The array of wires may be connected to the remainder of the logic (e.g., demux circuitry 110 and/or comparator circuitry 150), for example, via place and route.

The N-wire bus 140 may be connected to comparator circuitry 150 to ensure that all values are as expected at sampling time. This includes not only the M active wires driving the PRBS values (e.g., bit values), but the N-M wires that should be tied to a value of zero, or to ground. For comparator circuitry 150 to determine whether the values driven across the active wires are what they should be (and also determine the wires that should be tied to ground or to a value of zero), the comparator circuitry 150 may be connected to PRBS 120 so as to receive the expected values (170). In accordance with at least one embodiment, the comparator circuitry 150 may be configured to perform the comparison logic on every RTC clock cycle, giving ample time for propagation of the signals across the wire array 140.

In accordance with at least one embodiment, a value mismatch on the wire array 140 may be an indication of a breach in the defensive shield (e.g., security system 100) or an attack on the ASIC. Such a value mismatch may be detected, for example, by comparator circuitry 150, which sends a signal (160) to an associated alert response mechanism. Depending on the implementation, the alert response mechanism may be a part of, connected to, and/or otherwise be in communication with (e.g., via a direct or indirect connection over a wired or wireless network) security system 100 such that the signal (160) generated by comparator circuitry 150 is received and processed by the alert response mechanism in an efficient manner.

Figure 2:
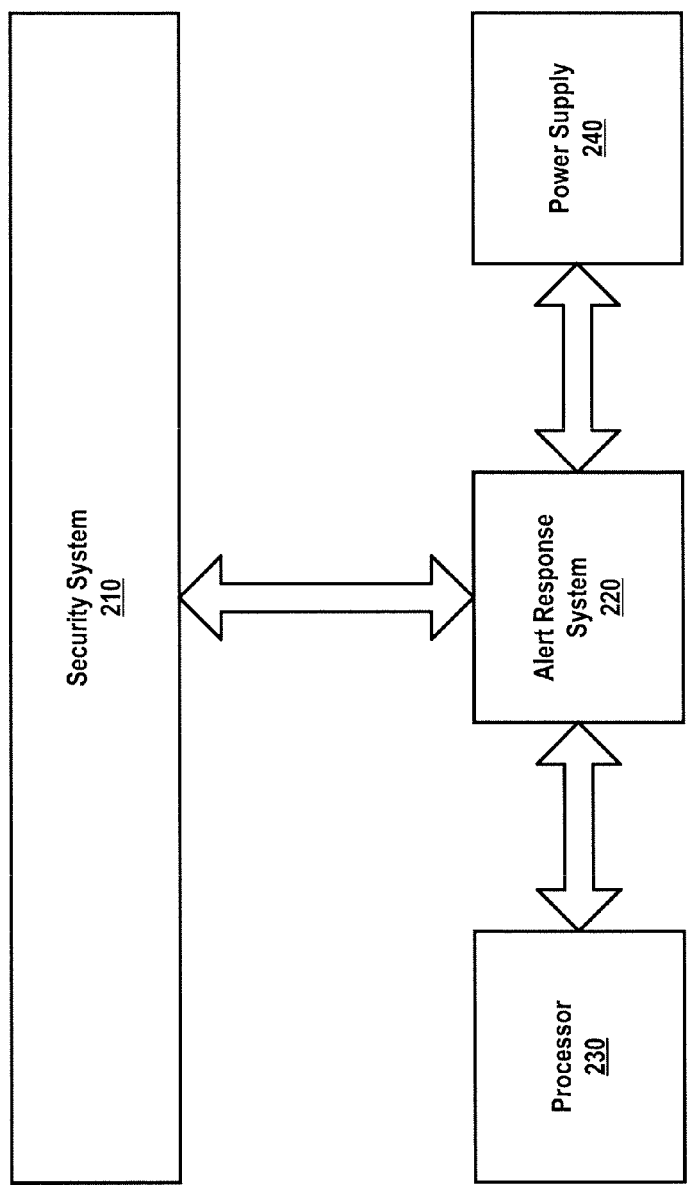
FIG. 2 is a block diagram illustrating an example arrangement of a security system and an alert response system for an integrated circuit according to one or more embodiments described herein.

FIG. 2 shows an example arrangement of a security system 210 and alert response system 220 for an integrated circuit. In accordance with at least one embodiment, the security system 210 may be in communication with (e.g., over a network) or connected to (e.g., via a wired or wireless connection) the alert response system 220 such that if the security system 210 detects a possible fault or a potential breach in the defensive shield of the integrated circuit, the security system 210 can transmit (e.g., send, provide, etc.) a signal to the alert response system 220 (e.g., signal (160) to alert response mechanism in the example system 100 shown in FIG. 1), and the alert response system 220 can determine whether to take any action, and if so, what specific action to take.

The alert generated or the response taken by the alert response system 220, for example, in response to receiving a signal from the security system 210 (e.g., signal (160) from comparator circuitry 150 of the example system 100 shown in FIG. 1 and described in detail above) can be handled in a number of configurable ways. For example, such an alert may be in the form of an actionable response, such as an interrupt to the processor 230, or a partial or complete shut-down of the integrated circuit by controlling the power supply 240. Depending upon the particular attack, it may be best for the response to be slow and measured, or it may be better if the response is fast and destructive. In another example, the alert response system 220 may be configured to make it appear as though nothing is happening at all, while in actuality the secrets of the device (e.g., the ASIC) are being locked-down or otherwise secured. Thus, in accordance with at least one embodiment, the security system 210 may include, or operate in conjunction with an alert response system (mechanism) 220 that is configured to have varying levels of response (e.g., attach a particular type of response to a given threat).

It should be noted that even when the ASIC is powered down, or in an "off" state, the security system (e.g., example system 100 shown in FIG. 1) may continue to monitor activity each RTC clock cycle. For example, any detected intrusion may result in the increment of a counter that is active during power down (e.g., using always-on logic). Upon return from the power down state (e.g., when the ASIC is powered-up or otherwise switched to the "on" state), the non-always-on logic becomes available and immediately senses (e.g., determines) the value of the counter. If the value is non-zero, an alert may be sent and the value of the counter may be stored for subsequent use (e.g., to be queried by an associated program).

Figure 4:
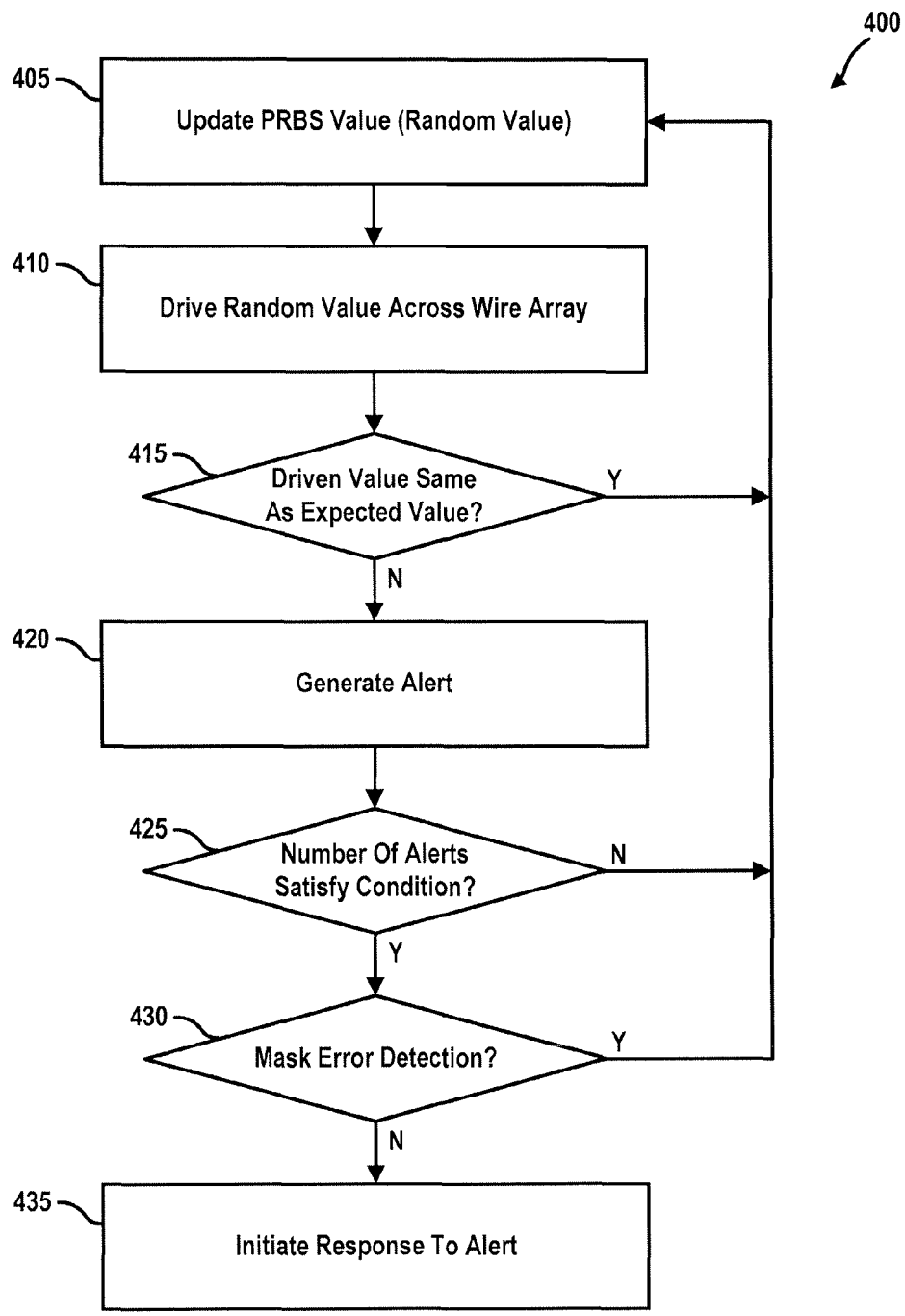
FIG. 4 is a flowchart illustrating an example method for defending against invasive attacks on an application specific integrated circuit according to one or more embodiments described herein.

FIG. 4 is an example process 400 for defending against invasive attacks on an application specific integrated circuit.

At block 405, a value (e.g., random value) of the PRBS (e.g., PRBS generator circuitry 120 in the example system 100 shown in FIG. 1) may be updated. The PRBS may be updated, for example, using output generated by a TRNG (e.g., TRNG 130), thereby providing a a source of entropy to the PRBS and making it more difficult for a potential attacker to guess future values of the PRBS.

At block 410, the updated random value of the PRBS may be driven across the wire array (e.g., N-wire bus 140 in the example system 100 shown in FIG. 1). In accordance with at least one embodiment, the updated value of the PRBS (from block 405) may be driven across one or more of the trace wires constituting the array.

At block 415, a determination may be made as to whether the value driven across the wire array at block 410 matches (is the same as) the expected value. For example, in accordance with at least one embodiment, the determination made at block 415 may be based on a comparison (e.g., performed by comparator circuitry 150 in the example system 100 shown in FIG. 1) of the value transferred to the array at one end with the value received at the other end of the array. Such a comparison may involve not only the one or more active wires of the array driving the PRBS values (e.g., bit values generated at block 405), but also the traces of the array tied to a value of zero, or to ground. In accordance with at least one embodiment, the comparison at block 415 may be performed on every RTC clock cycle, allowing ample time for propagation of the signals across the wire array (at block 410).

If it is determined at block 415 that the driven value is the same as the expected value, the process may return to block 405 where the PRBS value is again updated.

On the other hand, if it is determined at block 415 that the value driven across the wire array does not match the expected value, then at block 420 an alert may be generated. For example, in accordance with at least one embodiment, a value mismatch on the wire array (determined at block 415) may be an indication of a breach in the defensive shield (e.g., security system 100) or an attack on the ASIC. If such a value mismatch is detected at block 415 (e.g., by comparator circuit 150), then an alert signal (e.g., signal (160) in the example system 100 shown in FIG. 1) may be generated at block 420. The alert generated at block 420 may be sent to an alert response mechanism or system associated with or a part of the security system (e.g., alert response system 220 as shown in FIG. 2).

At block 425, it may be determined whether, based on the alert generated at block 420, a number of generated alerts satisfy a condition. For example, in accordance with at least one embodiment, the determination made at block 425 may be a determination of whether a threshold number of alerts (e.g., 3 alerts, 5 alerts, 10 alerts, etc.) have been generated during a predetermined period of time (e.g., 30 seconds, 2 minutes, 5 minutes, etc.), whether a threshold number of alerts have been generated within a specific time interval (e.g., 5 seconds, 30 seconds, etc.) of one another, which may be indicative of a particular type of potential attack on the chip, or the like. If it is determined at block 425 that the number of generated alerts does not satisfy the condition, the process may return to block 405 where a PRBS value is updated.

If instead it is determined at block 425 that the number of generated alerts satisfies the condition, then at block 430 a determination may be made as to whether an error or fault detection masking process or parameter is in place. If it is determined at block 430 that the detected error or fault should be masked, the process may return to block 405. For example, in accordance with at least one embodiment, the alert response system (e.g., alert response system 220 as shown in FIG. 2) may be configured to make it appear as though nothing is happening at all (e.g., error or fault detection masking at block 430), while in actuality the secrets of the device (e.g., the ASIC) are being locked-down or otherwise secured.

On the other hand, if it is determined at block 430 that no error or fault detection masking is in place, then at block 435 an actionable response to the alert generated at block 420 may be initiated. Such an actionable response may be, for example, an interrupt to the processor of the chip (e.g., processor 230), or a partial or complete shut-down of the chip by controlling the power supplied to the chip (e.g., controlling power supply 240). Depending upon the particular circumstances (e.g., the number of generated alerts within a period of time, the time intervals between generated alerts, etc.), the response initiated at block 435 may be a slow and calculated response, or instead the response may be fast and destructive.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via one or more ASICs, Field Programmable Gate Arrays (FPGAs), digital signal processors (DSPs), or other integrated formats. However, those skilled in the art will recognize that some aspects of the embodiments disclosed herein, in whole or in part, can be equivalently implemented in one or more integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method of defending an application specific integrated circuit (ASIC) against invasive attacks, the method comprising:
   generating, by a computing device, a pseudo-random binary sequence (PRBS);
   driving, by the computing device, the PRBS into an end of a wire array of the ASIC;
   determining, by the computing device, whether binary values at another end of the wire array match expected values, the expected values based on the PRBS; and
   responsive to determining that the binary values at the other end of the wire array do not match the expected values, generating, by the computing device, an alert signal effective to cause an alert response mechanism or system of the ASIC to secure, lock-down, or make inaccessible resources or secrets of the ASIC.

2. The method of claim 1, further comprising:
   prior to generating the PRBS:
      generating, by the computing device, another PRBS;
      driving, by the computing device, the other PRBS into the end of the wire array of the ASIC; and
      determining, by the computing device, whether other binary values at the other end of the wire array match other expected values, the other expected values based on the other PRBS; and
   wherein the PRBS is generated responsive to determining that the other binary values match the other expected values.

3. The method of claim 1, wherein the PRBS is generated by utilizing a source of entropy received from a true random number generator (TRNG).

4. The method of claim 1, wherein the PRBS is generated by a linear feedback shift register.

5. The method of claim 1, wherein the wire array comprises a plurality of trace wires; and
   the driving the PRBS into the end of the wire array of the ASIC comprises driving the PRBS into a subset of the plurality of trace wires, the subset of the plurality of trace wires selected based on a real-time clock period.

6. The method of claim 1, wherein the wire array comprises a plurality of trace wires; and
   the driving the PRBS into the end of the wire array of the ASIC comprises driving the PRBS into each of the plurality of trace wires.

7. The method of claim 1, wherein the driving and determining are performed according to a real-time clock period.

8. The method of claim 1, wherein the determining comprises detecting a short-circuit fault, an open-fault, or a stuck-at fault.

9. The method of claim 8, wherein the alert signal is generated responsive to a detection of the short-circuit fault, the open-fault, or the stuck-at fault.

10. The method of claim 1, wherein the alert signal is effective to:
    cause an interrupt to a processor of the ASIC; or
    control a power supply of the ASIC.

11. An apparatus for defending an application specific integrated circuit (ASIC) against invasive attacks, the apparatus comprising:
    a wire array comprising a plurality of trace wires arranged across the ASIC;
    a true random number generator (TRNG) for providing a source of entropy;
    a pseudo-random binary sequence generator that generates, based on the entropy provided by the TRNG, a pseudo-random binary sequence (PRBS) that is fed into an end of the wire array; and
    comparison circuitry that:
       is connected to another end of the wire array,
       determines whether binary values received at the other end of the wire array have expected values, the expected values based on the PRBS that is fed into the end of the wire array, and
       responsive to determining that the binary values do not match the expected values, generates an alert signal effective to cause an alert response mechanism or system of the ASIC to secure, lock-down, or make inaccessible resources or secrets of the ASIC.

12. The apparatus of claim 11, wherein the pseudo-random binary sequence generator generates a plurality of PRBS and each of the PRBS is fed into one or more of the trace wires at the end of the wire array.

13. The apparatus of claim 11, wherein the comparison circuitry compares the binary values from a subset of the trace wires to the expected values, the subset of the trace wires being toggled according to a real-time clock period.

14. The apparatus of claim 11, wherein the pseudo-random binary sequence generator is a linear feedback shift register.

15. The apparatus of claim 11, further comprising:
   demultiplexing circuitry that connects the pseudo-random binary sequence generator to the end of the wire array.

16. The apparatus of claim 15, wherein the demultiplexing circuitry feeds the PRBS into one of the trace wires, and the remaining trace wires are grounded.

17. The apparatus of claim 11, wherein the comparison circuitry detects a short-circuit fault, an open-fault, or a stuck-at fault based on the binary values.

18. The apparatus of claim 17, wherein the alert signal is generated responsive to detecting the a short-circuit fault, the open-fault, or the stuck-at fault.

19. The apparatus of claim 11, wherein the determination that the binary values do not match the expected values is one of a plurality of similar determinations of unmatched binary values, and the alert signal is generated responsive to a number of the determinations of unmatched binary values reaching a threshold or a time between the determinations of unmatched binary values.

20. The apparatus of claim 11, wherein the alert signal is effective to:
   cause an interrupt to a processor of the ASIC; or
   control a power supply of the ASIC.

* * * * *